(12) United States Patent
Yuan et al.

(10) Patent No.: US 11,972,108 B2
(45) Date of Patent: Apr. 30, 2024

(54) PARAMETER REDUNDANCY REDUCTION METHOD

(71) Applicant: INTERNATIONAL BUSINESS MACHINES CORPORATION, Armonk, NY (US)

(72) Inventors: Zhong Fang Yuan, Xi'an (CN); Tong Liu, Xi'an (CN); Li Juan Gao, Xi'an (CN); Na Liu, Xi'an (CN); Xiang Yu Yang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 17/525,999

(22) Filed: Nov. 15, 2021

(65) Prior Publication Data
US 2023/0152971 A1 May 18, 2023

(51) Int. Cl.
*G06F 3/06* (2006.01)
*G06N 3/04* (2023.01)

(52) U.S. Cl.
CPC .......... *G06F 3/0608* (2013.01); *G06F 3/0641* (2013.01); *G06F 3/0673* (2013.01); *G06N 3/04* (2013.01)

(58) Field of Classification Search
CPC .... G06F 3/0608; G06F 3/0641; G06F 3/0673; G06N 3/04; G06N 3/044; G06N 3/045; G06N 3/08; G06N 3/084
USPC ........................................................ 711/154
See application file for complete search history.

(56) References Cited

U.S. PATENT DOCUMENTS

| | | | |
|---|---|---|---|
| 10,223,635 B2 | 3/2019 | Annapureddy | |
| 2018/0053091 A1 | 2/2018 | Savvides | |
| 2021/0124560 A1* | 4/2021 | Liu | G06F 7/5277 |
| 2021/0150769 A1* | 5/2021 | Babaheidarian | G06F 18/2193 |
| 2022/0397425 A1* | 12/2022 | Armelin | B64D 45/00 |

FOREIGN PATENT DOCUMENTS

| | | |
|---|---|---|
| CN | 106485316 B | 4/2019 |
| JP | WO2018223822 | 12/2018 |

OTHER PUBLICATIONS

Mell, Peter et al.; "The NIST Definition of Cloud Computing;" National Institute of Standards and Technology; Special Publication 800-145; Sep. 2011; 7 pages.
(Continued)

*Primary Examiner* — Hashem Farrokh
(74) *Attorney, Agent, or Firm* — Schmeiser, Olsen & Watts, LLP; Edward Wixted

(57) ABSTRACT

A method, computer program product, and computer system for generating and using a basic state layer. N task models are provided (N≥2). Each task model was trained on a same pre-trained backbone model. Each task model includes M feature layers and a task layer (M≥1). Each feature layer of each task model includes a parameter matrix that is different for the different models. An encoder-decoder model is trained. The encoder-decoder model includes sequentially: an input layer, an encoder, M hidden layers, a decoder, and an output layer. The encoder is a neural network that maps and compresses the parameter matrices in the input layer into the M hidden layers, which generates a basic state model. The decoder is a neural network that receives the basic state model as input and generates the output layer to be identical to the input layer.

20 Claims, 9 Drawing Sheets

(56) References Cited

OTHER PUBLICATIONS

Liu et al., AdaSpring: Context-adaptive and Runtime-evolutionary Deep Model Compression for Mobile Applications, Jan. 28, 2021, Proc. ACM Interact. Mob. Wearable Ubiquitous Technol., vol. 5, No. 1, Article 24. Publication date: Mar. 2021, https://www.researchgate.net/publication/348860889, 22 pages.

Cheng et al., An Exploration of Parameter Redundancy in Deep Networks with Circulant Projections, 550-5499/15 $31.00 © 2015 IEEE DOI 10.1109/ICCV.2015.327, https://ieeexplore.ieee.org/document/7410684, pp. 2857-2865.

Rohit Bandaru, Pruning Neural Networks, Neural networks can be made smaller and faster by removing connections or nodes, Sep. 2, 2020, Retrieved from the internet on Jul. 1, 2021, https://towardsdatascience.com/pruning-neural-networks-1bb3ab5791f9, 5 pages.

Matsuno et al., Reduction of Parameter Redundancy in Biaffine Classifiers with Symmetric and Circulant Weight Matrices, 32nd Pacific Asia Conference on Language, Information and Computation Hong Kong, Dec. 1-3, 2018 Copyright 2018 by the authors, https://www.aclweb.org/anthology/Y18-1052/, pp. 447-455.

The encoder-decoder model as a dimensionality reduction technique, A blog on science, Jan. 21, 2021, Retrieved from the internet on Jul. 1, 2021, https://ekamperi.github.io/machine%20learning/2021/01/21/encoder-decoder-model.tml, 14 pages.

Vaswani et al., Attention Is All You Need, 31st Conference on Neural Information Processing Systems (NIPS 2017), Long Beach, CA, USA, https://papers.nips.cc/paper/2017/file/3f5ee243547dee91fbd053c1c4a845aa-Paper.pdf, 11 pages.

\* cited by examiner

PARAMETER REDUNDANCY REDUCTION METHOD

Embodiments of the present invention relates in general to multiple task models trained on a same pre-trained backbone model, and in particular to reducing parameter redundancy in multiple task models trained on the same pre-trained backbone model In the training process of machine learning, a backbone model may be used as a pre-training model, and in different scenarios, different training data is used to fine-tune network parameters of one or more layers in the backbone model. The types of commonly used pre-trained backbone models are relatively fixed, and multiple models deployed on the same server typically use the same pre-trained backbone model. Thus, most of the parameters are the same and redundant across the multiple task models using the same pre-trained backbone model, which results in an inefficient use of storage space storing redundant parameters. Because the pre-trained backbone model is usually large in size (e.g., in excess of 500M), a large amount of storage space is wasted or lost in practice.

SUMMARY

Embodiments of the present invention provide a method, a computer program product and a computer system, for generating and using a basic state layer.

One or more processors of a computer system provide N task models. Each task model is characterized by a unique task identifier (task ID) and was trained on a same pre-trained backbone model. Each task model comprises M feature layers and a task layer. Each feature layer m (m=1, . . . , M) of task model n (n=1, . . . , N) comprises a parameter matrix $P_{nm}$ that is different for the different models 1, . . . , N for each feature layer m due to each task model having been trained using different tasks. N is at least 2 and M is at least 1.

The one or more processors train an encoder-decoder model. The encoder-decoder model comprises sequentially: an input layer, an encoder, M hidden layers, a decoder, and an output layer. The input layer comprises each parameter matrix $P_{nm}$ (n=1, . . . , N and m=1, . . . , M). The encoder is a neural network that maps and compresses the parameter matrices in the input layer into the M hidden layers. The M hidden layers with the mapped parameter matrices included therein are designated as the basic state model. The decoder is a neural network that receives the basic state model as input and generates the output layer to be identical to the input layer during the. training.

The one or more processors store the basic state model in a data storage repository.

DETAILED DESCRIPTION

Figure 1:
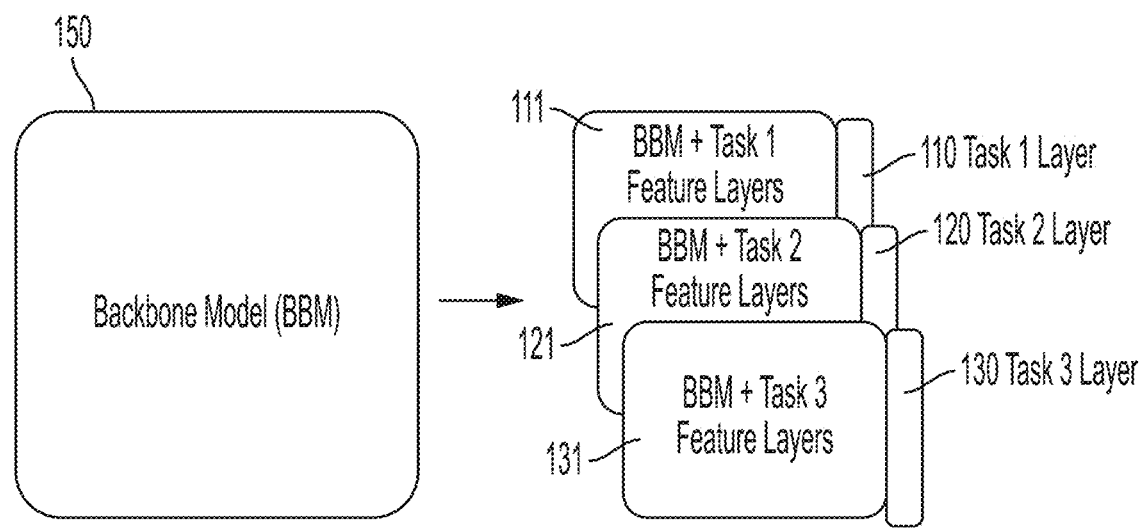
FIG. 1 depicts a pre-trained backbone model and three task models each combined with the pre-trained backbone model, in accordance with embodiments of the present invention embodiments of the present invention.

FIG. 1 depicts a pre-trained backbone model (BBM) 150 and three task models each combined with the pre-trained backbone model, in accordance with embodiments of the present invention embodiments of the present invention.

An example of the pre-trained backbone model 150 is Bidirectional Encoder Representations from Transformers (BERT), which is a 12 to 24 layer transformer network and has a pre-trained backbone model size from 330 MB to 700 MB The three task models are task model 1, task model 2, and task model 3 which perform natural language processing (NLP) tasks. All three task models use the same pre-trained backbone model BERT.

Task model 1 comprises a task 1 layer 110 and a combination 111 of the pre-trained backbone model 150 and feature layers of task model 1.

Task model 2 comprises a task 2 layer 120 and a combination 121 of the pre-trained backbone model 150 and feature layers of task model 2.

Task model 3 comprises a task 3 layer 130 and a combination 131 of the pre-trained backbone model 150 and feature layers of task model 3.

In one embodiment, the task 1 model was generated for a task of text classification and has a task model size of 700 MB (i.e., 0.7 GB).

In one embodiment, the task 2 model was generated for a task of Named Entity Recognition (NER) and has a task model size of 1.2 GB.

In one embodiment, the task 3 model was generated for a task of Stanford Question Answering Dataset (SQuAD) and has a task model size of 830 MB (i.e., 0.8 GB).

The amount of storage space for task models 1, 2 and 3 collectively is 2.7 GB (i.e., 0.7+1.2+0.8 GB) which includes redundant storage of parameters because all three task models are trained using the same pre-trained backbone model 150.

Embodiments of the present invention eliminate or significantly an amount of storage needed to store all three models, by eliminating or significantly reducing the redundant storage of parameters.

Figure 2:
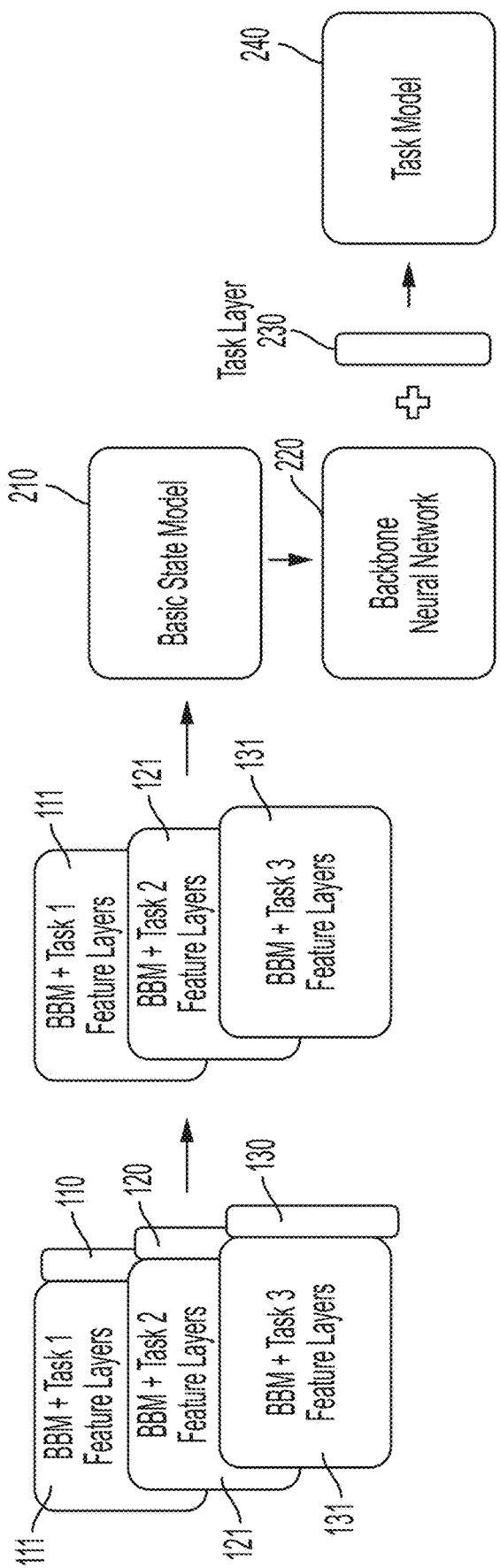
FIG. 2 depicts generation and usage of a basic state model, in accordance with embodiments of the present invention.

FIG. 2 depicts generation and usage of a basic state model, in accordance with embodiments of the present invention.

In FIG. 2, the task layers 110, 120 and 130 are removed and the combinations 111, 121 and 131 of the pre-trained backbone model 150 and the feature layers of task models 1, 2 and 3, respectively, are combined into a basic state model 210 which is new backbone model that stores the parameters of task models 1, 2 and 3 with little or no redundancy.

The basic state model 210 is within backbone neural network 220 which combines the basic state model 210 with a task layer 230 of a specified task model of the three task models to regenerate the task model 240.

Figure 3:
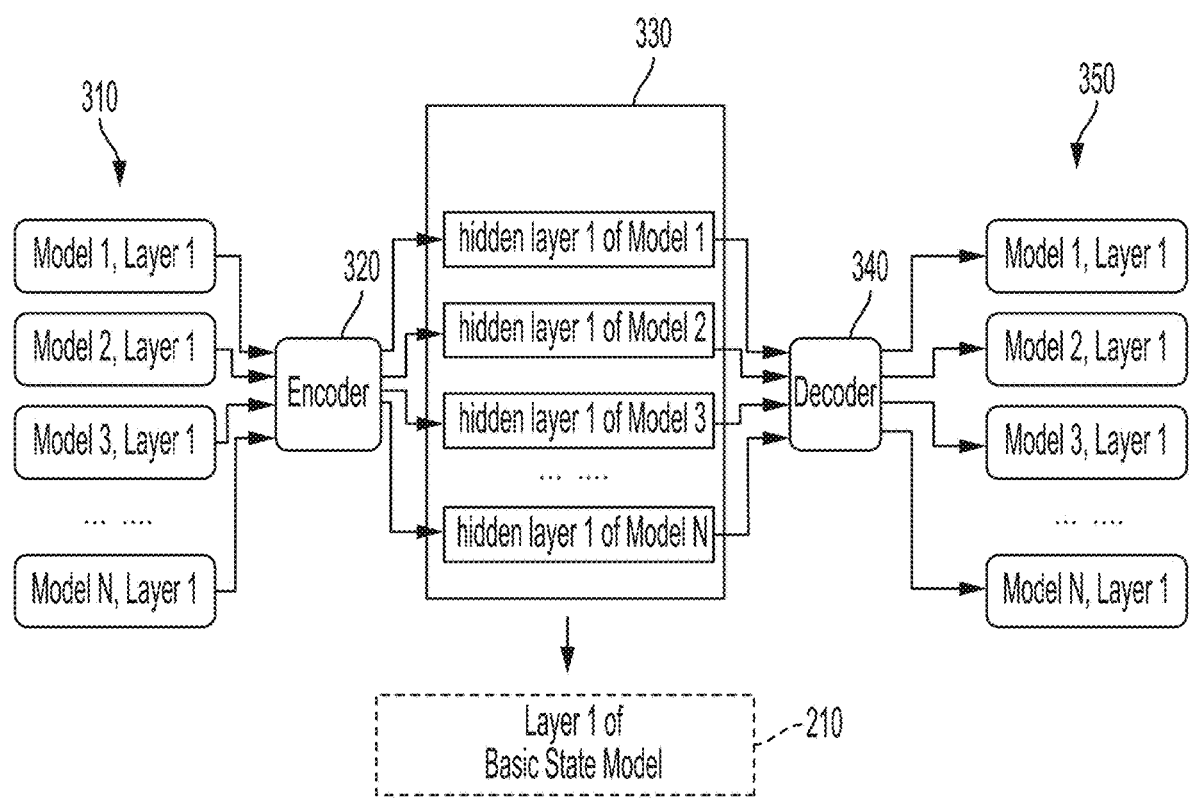
FIG. 3 depicts training an encoder-decoder model, in accordance with embodiments of the present invention.

FIG. 3 depicts training an encoder-decoder model, in accordance with embodiments of the present invention.

The encoder-decoder model utilizes N task models. Each task model is characterized by a unique task identifier (task ID) and was trained on a same pre-trained backbone model. Each task model includes M feature layers and a task layer. Each feature layer m (m=1, . . . , M) of task model n (n=1, . . . , N) includes a parameter matrix $P_{nm}$ that is different for the different models 1, . . . , N for each feature layer m, due to each task model having been trained using different tasks. N is at least 2 and M is at least 1.

The encoder-decoder model includes sequentially: an input layer 310, an encoder 320, M hidden layers 330 (only hidden layer 1 is shown), a decoder 340, and an output layer 350. The input layer 310 includes the M layers of each task model of the N task models (only layer 1 of the N task models is shown). The parameter matrices $P_{nm}$ (n=1, . . . , N and m=1, . . . , M) of the N task models are provided as input to the encoder 320.

The input layer 310 includes the parameter matrices $P_{nm}$ (n=1, . . . , N and m=1, . . . M) of the N task models, which are provided as input to the encoder 320.

The encoder 320 is a neural network configured to map the parameter matrices in the input layer 310 into the M hidden layers 330.

In one embodiment, the encoder 320 has a transformer architecture.

The transformer architecture, as used by the neural network of the encoder 320 is defined as the transformer architecture described in the paper: Vaswani, Ashish & Shazeer, Noam & Parmar, Niki & Uszkoreit, Jakob & Jones, Llion & Gomez, Aidan & Kaiser, Lukasz & Polosukhin, Illia, "Attention is all you need", 2017. This transformer architecture ignores recurrences and relies entirely on Attention to draw dependencies between input and output, which significantly improves performance of NLP translation models. Attention, as known by a person of ordinary skill in the art, selectively enhances some inputs while focusing less attention on, or ignoring, other inputs, depending on a context of the inputs.

The M hidden layers 330 with the mapped parameter matrices included therein are compressed into a matrix and designated as a basic state model 210 (only layer 1 of the basic state model 210 is shown).

The decoder 340 is a neural network configured to receive the basic state model 210 as input and generate the output layer 350 to be identical to the input layer 310 during the training of encoder-decoder model.

Figure 4:
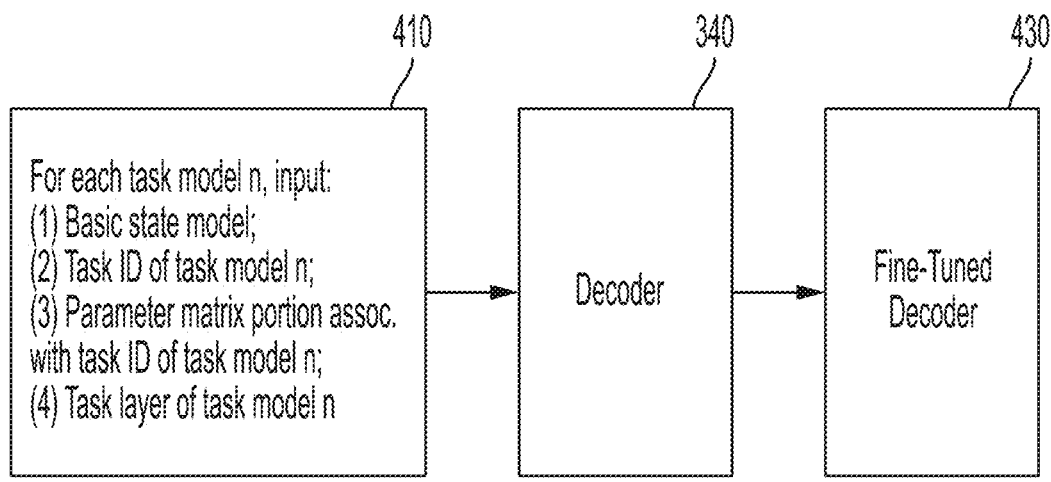
FIG. 4 depicts fine-tuning a decoder of the trained encoder-decoder model to generate a fine-tuned decoder, in accordance with embodiments of the present invention.

FIG. 4 depicts fine-tuning the decoder 340 of the trained encoder-decoder model (see FIG. 3) to generate a fine-tuned decoder 430, in accordance with embodiments of the present invention.

The fine-tuning of the decoder 340 is based on the following input 410 to the decoder 320 for each task model n (n=1, . . . , N): the basic state model 210, the task ID of task model n, the parameter matrices $P_{nm}$ associated with the task ID of task model n, and the task layer of task model n.

Figure 5:
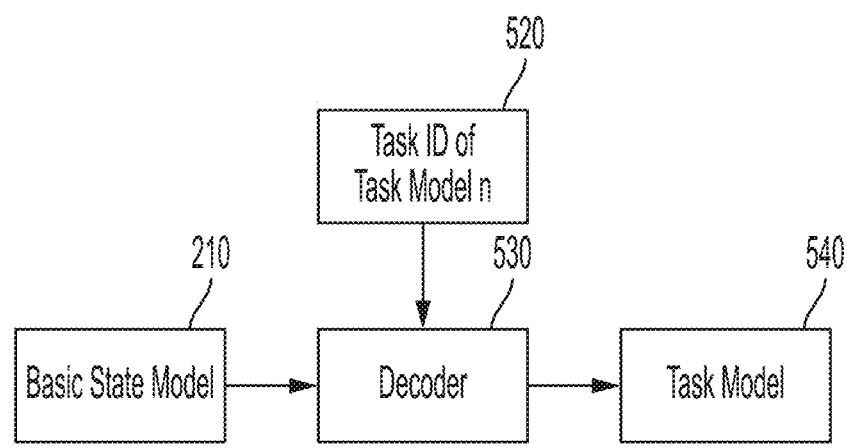
FIG. 5 depicts regeneration of a task model using the decoder, in accordance with embodiments of the present invention.

In some embodiments, the fine-tuning of the decoder 340 is implemented. In other embodiments, the fine-tuning of the decoder 340 is omitted and thus not implemented FIG. 5 depicts regeneration of a task model 540 using the decoder 530, in accordance with embodiments of the present invention.

In one embodiment, the decoder 530 is the decoder 340 of the trained encoder-decoder model (see FIG. 3).

The decoder 530 uses the basic state model 210 and the task ID 520 of task model 540 as input to generate the task model 540. The task ID 520 identifies the task model 540, and in particular, identifies the task layer of the task model 540. The task layer of the task model 540 is needed for regenerating the task model 540. In one embodiment, the task ID 520 is a text word. In one embodiment, the task ID 520 is a specific natural language instruction.

Figure 6:
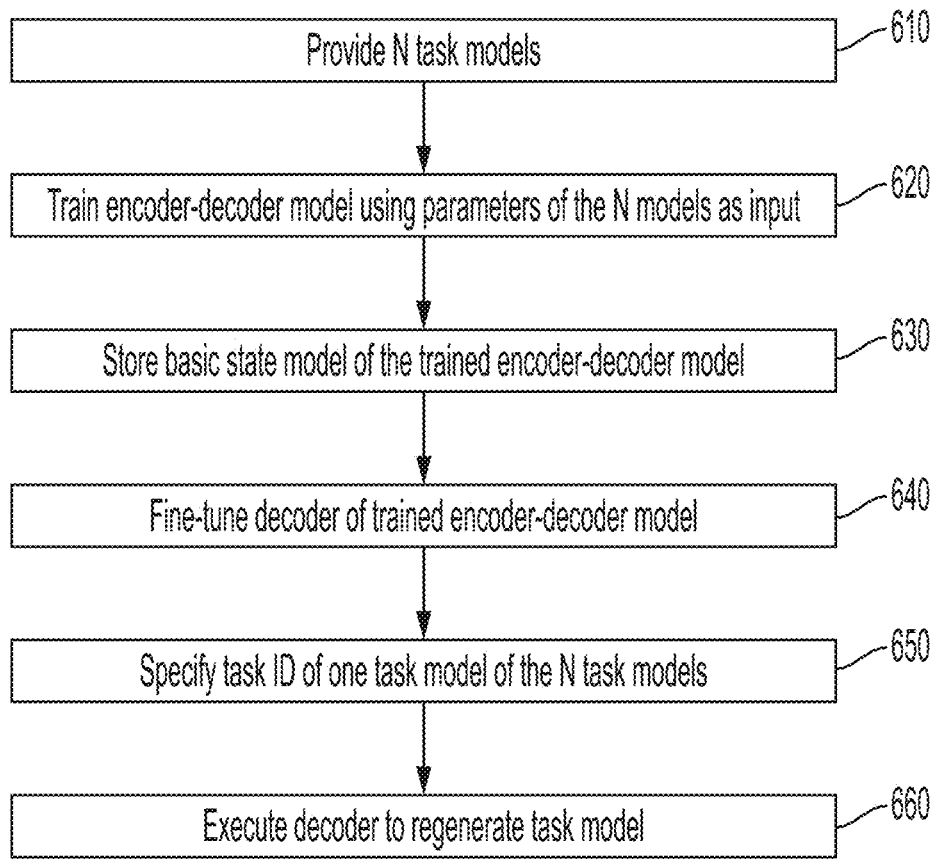
FIG. 6 depicts a method for generating and using a basic state layer, in accordance with embodiments of the present invention.

FIG. 6 depicts a method for generating and using a basic state layer, in accordance with embodiments of the present invention. The method of FIG. 6 includes steps 610-660.

Step 610 provides N task models. Each task model is characterized by a unique task identifier (task ID) and was trained on a same pre-trained backbone model. Each task model includes M feature layers and a task layer. Each feature layer m (m=1, . . . , M) of task model n (n=1, . . . , N) comprises a parameter matrix $P_{nm}$ that is different for the different models 1, . . . , N for each feature layer m due to each task model having been trained using different tasks. N is at least 2 and M is at least 1.

Examples of pre-trained backbone models include: Bidirectional Encoder Representations from Transformers (BERT), ALBERT which is a modified version of BERT, and Generative Pre-trained Transformer (GPT).

Step 620 trains an encoder-decoder model which includes sequentially: an input layer, an encoder, M hidden layers, a decoder, and an output layer. The input layer includes the parameter matrices $P_{nm}$ (n=1, . . . , N and m=1, . . . , M). The encoder is a neural network that maps and compresses the parameter matrices in the input layer into the M hidden layers. The M hidden layers with the mapped parameter matrices included therein are designated as a basic state model. The decoder is a neural network that receives the basic state model as input and generates the output layer to be identical to the input layer during the training.

In step 620, the parameter matrices $P_{nm}$ are compressed by a factor (called a "compression factor") of about N.

In one embodiment, the encoder has a transformer architecture.

Step 630 stores the encoder-decoder model in a data storage repository. The compression factor of about N achieved by the encoder in step 620 enables the encoder-decoder model to be stored in the data storage repository in less storage space by the compression factor of about N in comparison with storage space required to store the N task models individually in the data storage repository. For example, if N=10, the compression factor is about 10 and the storage space required to store the encoder-decoder model is about one tenth of the storage space required to store the 10 task models.

The compression eliminates or significantly reduces redundancies in the parameter matrices across the N task models, where the redundancies are caused by the N task models being trained on a same pre-trained backbone model. Consequently, the compression factor is about N, and not exactly N, because there are differences in the parameter matrices across the N task models due to each task model having been trained using different tasks, which defines the scope of "about" in the compression factor of "about N".

Step 640 fine-tunes the decoder of the trained encode-decoder model for each task model n (n=1, . . . , N), using as input to the decoder: the basic state model, the task ID of task model n, the parameter matrix $P_{nm}$ associated with the task ID of task model n, and the task layer of task model n.

Step 650 specifies a task ID of task model n selected from the group consisting of 1, 2, . . . , and N.

Step 660 executes the decoder to regenerate the task model n using the basic state model and the specified task ID of task model n as input.

In one embodiment, the decoder that is executed to regenerate the task model n is the decoder resulting from training the encoder-decoder model in step 620 (e.g., decoder 340 in FIG. 3).

In one embodiment, the decoder that is executed to regenerate the task model n is the fine-tuned decoder resulting from fine-tuning the decoder in step 640 (e.g., decoder 430 in FIG. 4).

Figure 7:
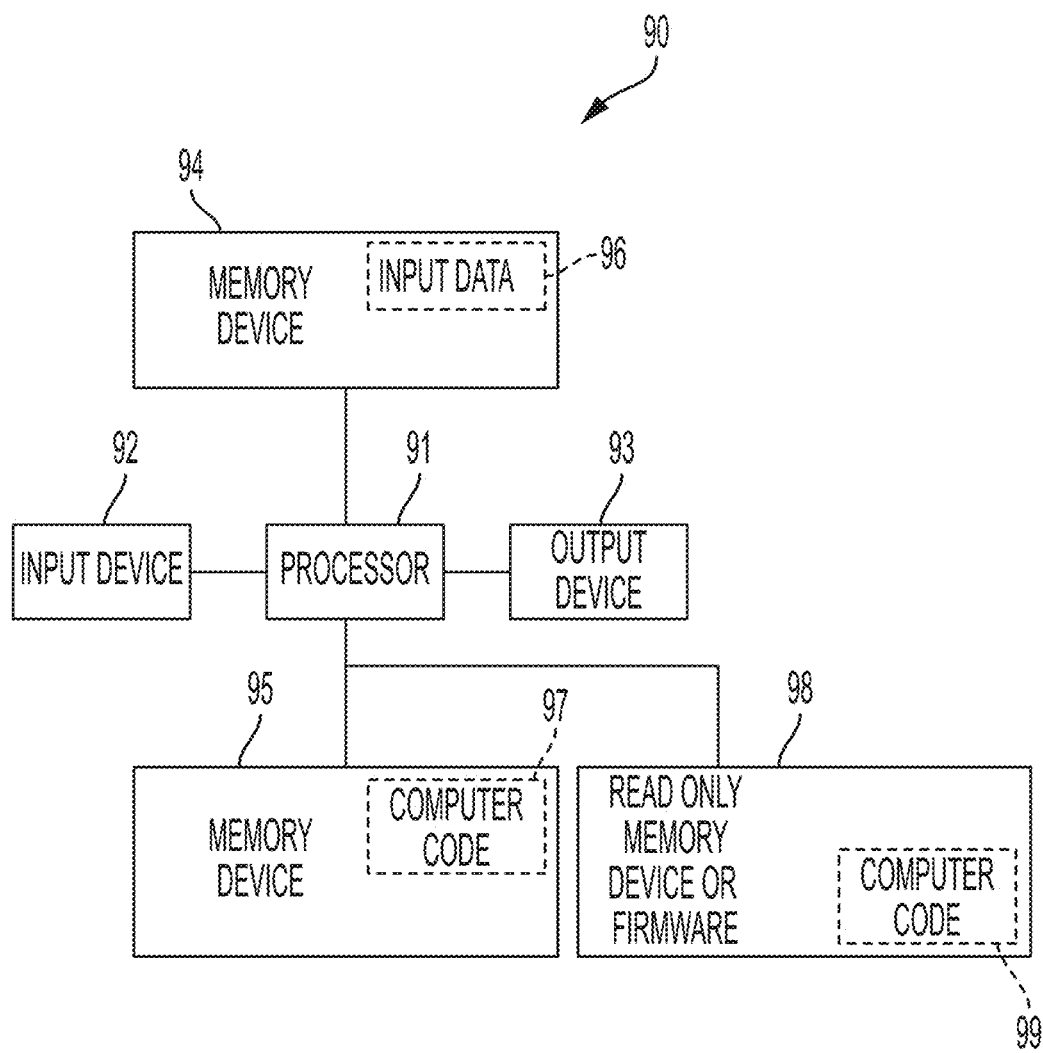
FIG. 7 illustrates a computer system, in accordance with embodiments of the present invention.

FIG. 7 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 98 (e.g., including algorithms) may be stored on a static, nonremovable, read-only storage medium such as a Read-Only Memory (ROM) device 99, or may be accessed by processor 91 directly from such a static, nonremovable, read-only medium 99. Similarly, in some embodiments, stored computer program code 97 may be stored as computer-readable firmware 99, or may be accessed by processor 91 directly from such firmware 99, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
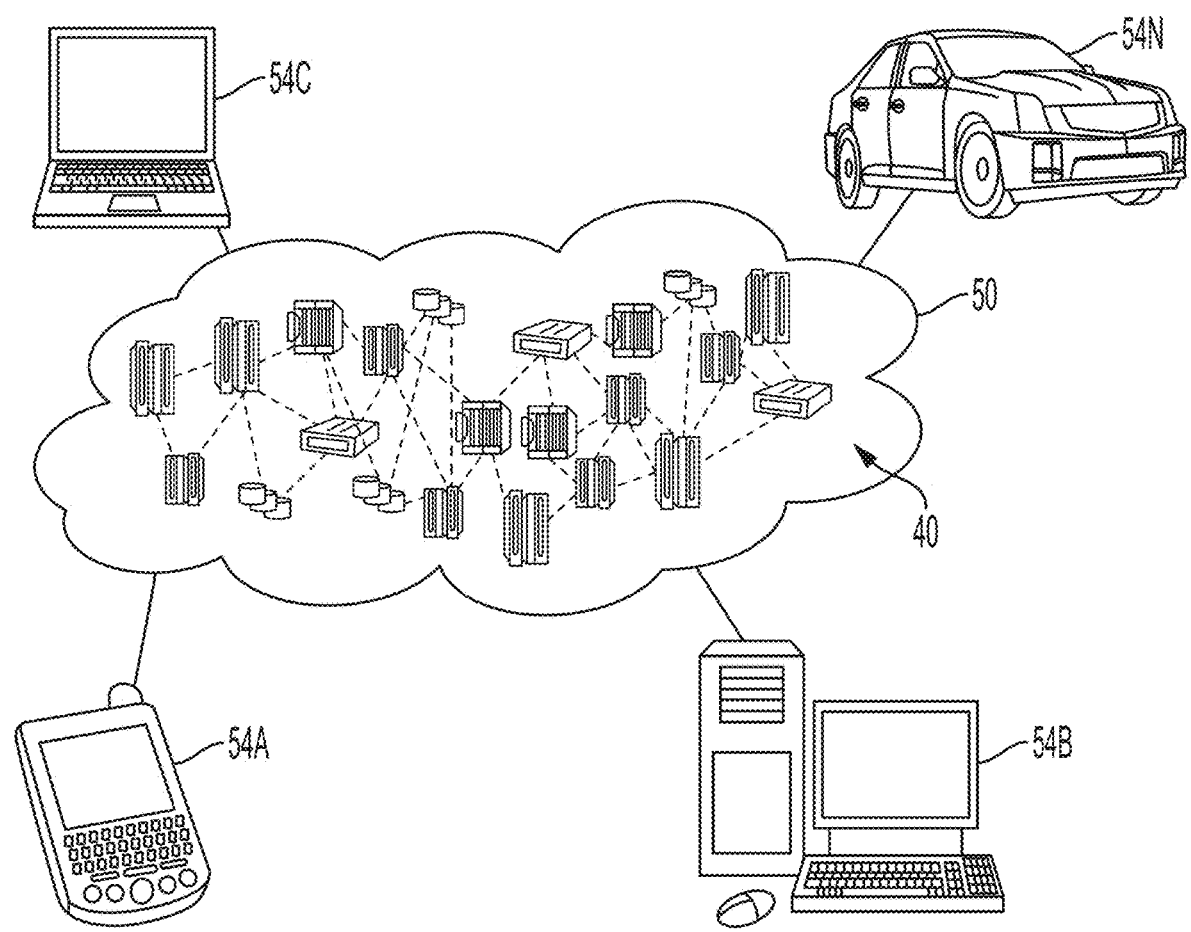
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
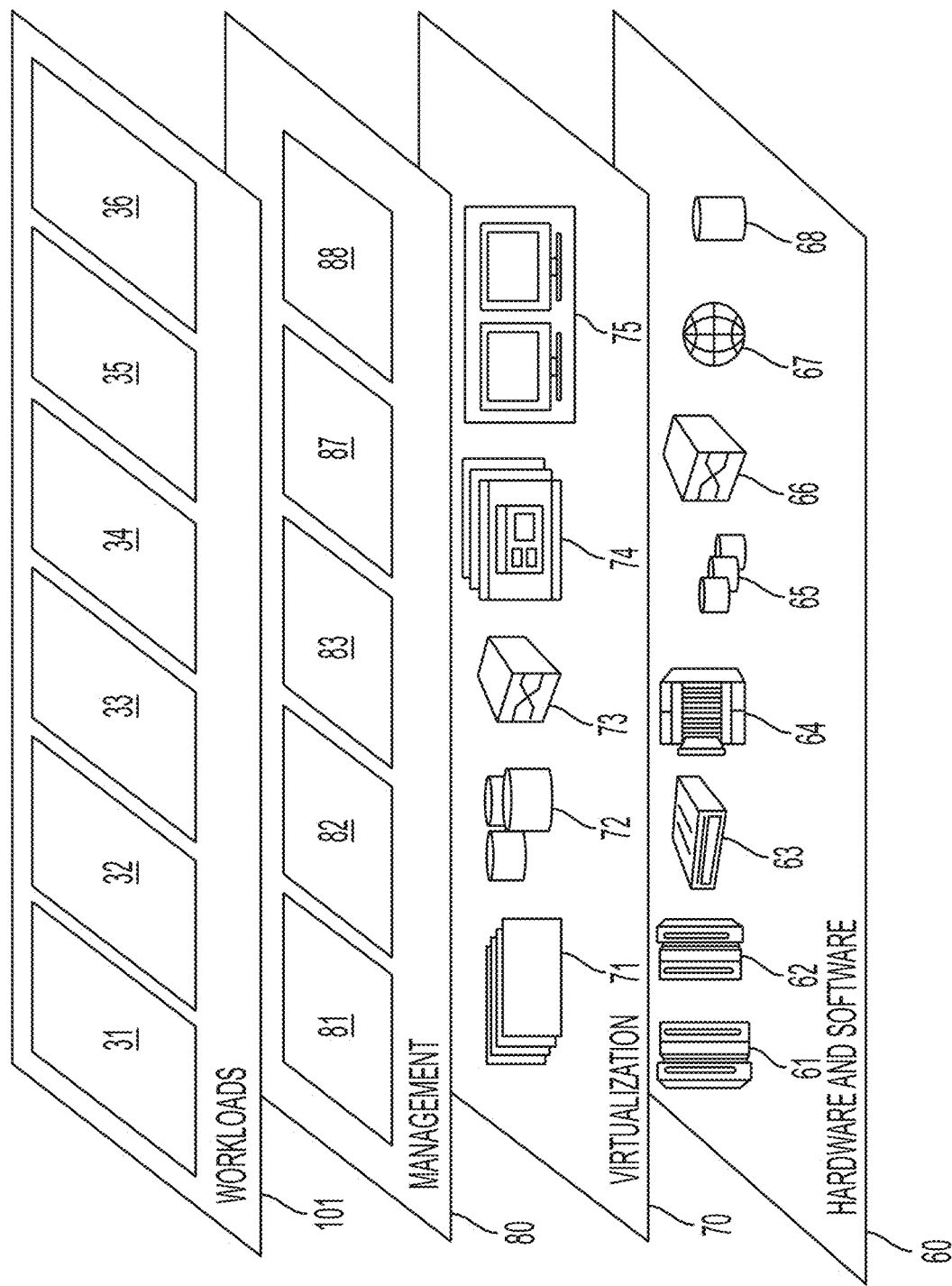
FIG. 9 depicts abstraction model layers, in accordance with embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 30 provides examples of functionality for which the cloud computing environment may be utilized. Examples of workloads and functions which may be provided from this layer include: mapping and navigation 31; software development and lifecycle management 32; virtual classroom education delivery 33; data analytics processing 34; transaction processing 35; and generating and using a basic state layer 36.

Examples and embodiments of the present invention described herein have been presented for illustrative purposes and should not be construed to be exhaustive. While embodiments of the present invention have been described herein for purposes of illustration, many modifications and changes will become apparent to those skilled in the art. The description of the present invention herein explains the principles underlying these examples and embodiments, in order to illustrate practical applications and technical improvements of the present invention over known technologies, computer systems, and/or products.

What is claimed is:

1. A method for generating and using a basic state layer, said method comprising:
providing, by one or more processors of a computer system, N task models, wherein each task model is characterized by a unique task identifier (task ID) and was trained on a same pre-trained backbone model, wherein each task model comprises M feature layers and a task layer, wherein each feature layer m (m=1, ..., M) of task model n (n=1, ..., N) comprises parameter matrices $P_{nm}$ that are different for the different models 1, ..., N for each feature layer m due to each task model having been trained using different tasks, wherein N is at least 2 and M is at least 1;
training, by the one or more processors, an encoder-decoder model, wherein the encoder-decoder model comprises sequentially: an input layer, an encoder, M hidden layers, a decoder, and an output layer, wherein the input layer comprises the parameter matrices $P_{nm}$ (n=1, ..., N and m=1, ..., M), wherein the encoder is a neural network that maps and compresses the parameter matrices in the input layer into the M hidden layers, wherein the M hidden layers with the mapped parameter matrices included therein are designated as the basic state model, and wherein the decoder is a neural network that receives the basic state model as input and generates the output layer to be identical to the input layer during said training; and
storing, by the one or more processors, the basic state model in a data storage repository.

2. The method of claim 1, said method further comprising:
fine-tuning, by the one or more processors, the decoder of the trained encode-decoder model for each task model n (n=1, ..., N), using as input to the decoder: the basic state model, the task ID of task model n, the parameter matrices $P_{nm}$ associated with the task ID of task model n, and the task layer of task model n.

3. The method of claim 2, said method further comprising:
for a specified task ID of one task model n selected from the group consisting of 1, 2, ... and N, executing, by the one or more processors, the fine-tuned decoder to regenerate the task model n using the basic state model and the specified task ID as input.

4. The method of claim 1, said method further comprising:
for a specified task ID of task model n selected from the group consisting of 1, 2, ..., and N, executing, by the one or more processors, the decoder to regenerate the task model n using the basic state model and the specified task ID as input.

5. The method of claim 1, wherein the encoder has a transformer architecture.

6. The method of claim 1, wherein storage space required to store the basic state model in the data storage repository is less, by a factor of about N, than storage space required to store the N task models in the data storage repository.

7. The method of claim 1, wherein the is Bidirectional Encoder Representations from Transformers (BERT).

8. The method of claim 1, wherein the task ID for at least one task model of the N task models is a specific natural language instruction.

9. A computer program product, comprising a computer readable storage medium having computer readable program code stored therein, said program code containing instructions executable by one or more processors of a computer system to implement a method for generating and using a basic state layer, said method comprising:
providing, by one or more processors of a computer system, N task models, wherein each task model is characterized by a unique task identifier (task ID) and was trained on a same pre-trained backbone model, wherein each task model comprises M feature layers and a task layer, wherein each feature layer m (m=1, ..., M) of task model n (n=1, ..., N) comprises parameter matrices $P_{nm}$ that are different for the different models 1, ..., N for each feature layer m due to each task model having been trained using different tasks, wherein N is at least 2 and M is at least 1;
training, by the one or more processors, an encoder-decoder model, wherein the encoder-decoder model comprises sequentially: an input layer, an encoder, M hidden layers, a decoder, and an output layer, wherein the input layer comprises the parameter matrices $P_{nm}$ (n=1, ..., N and m=1, ..., M), wherein the encoder is a neural network that maps and compresses the parameter matrices in the input layer into the M hidden layers, wherein the M hidden layers with the mapped parameter matrices included therein are designated as the basic state model, and wherein the decoder is a neural network that receives the basic state model as input and generates the output layer to be identical to the input layer during said training; and
storing, by the one or more processors, the basic state model in a data storage repository.

10. The computer program product of claim 9, said method further comprising:
fine-tuning, by the one or more processors, the decoder of the trained encode-decoder model for each task model n (n=1, ..., N), using as input to the decoder: the basic state model, the task ID of task model n, the parameter matrices $P_{nm}$ associated with the task ID of task model n, and the task layer of task model n.

11. The computer program product of claim 10, said method further comprising:
for a specified task ID of one task model n selected from the group consisting of 1, 2, ... and N, executing, by the one or more processors, the fine-tuned decoder to regenerate the task model n using the basic state model and the specified task ID as input.

12. The computer program product of claim 9, said method further comprising:

for a specified task ID of task model n selected from the group consisting of 1, 2, . . . , and N, executing, by the one or more processors, the decoder to regenerate the task model n using the basic state model and the specified task ID as input.

13. The computer program product of claim 9, wherein the encoder has a transformer architecture.

14. The computer program product of claim 9, wherein storage space required to store the basic state model in the data storage repository is less, by a factor of about N, than storage space required to store the N task models in the data storage repository.

15. A computer system, comprising one or more processors, one or more memories, and a computer readable storage medium, said computer readable storage medium containing program code executable by the one or more processors via the one or more memories to implement a method for generating and using a basic state layer, said method comprising:

providing, by one or more processors of a computer system, N task models, wherein each task model is characterized by a unique task identifier (task ID) and was trained on a same pre-trained backbone model, wherein each task model comprises M feature layers and a task layer, wherein each feature layer m (m=1, . . . , M) of task model n (n=1, . . . , N) comprises parameter matrices $P_{nm}$ that are different for the different models 1, . . . , N for each feature layer m due to each task model having been trained using different tasks, wherein N is at least 2 and M is at least 1;

training, by the one or more processors, an encoder-decoder model, wherein the encoder-decoder model comprises sequentially: an input layer, an encoder, M hidden layers, a decoder, and an output layer, wherein the input layer comprises the parameter matrices $P_{nm}$ (n=1, . . . , N and m=1, . . . , M), wherein the encoder is a neural network that maps and compresses the parameter matrices in the input layer into the M hidden layers, wherein the M hidden layers with the mapped parameter matrices included therein are designated as the basic state model, and wherein the decoder is a neural network that receives the basic state model as input and generates the output layer to be identical to the input layer during said training; and storing, by the one or more processors, the basic state model in a data storage repository.

16. The computer system of claim 15, said method further comprising:

fine-tuning, by the one or more processors, the decoder of the trained encode-decoder model for each task model n (n=1, . . . , N), using as input to the decoder: the basic state model, the task ID of task model n, the parameter matrices $P_{nm}$ associated with the task ID of task model n, and the task layer of task model n.

17. The computer system of claim 16, said method further comprising:

for a specified task ID of one task model n selected from the group consisting of 1, 2, . . . and N, executing, by the one or more processors, the fine-tuned decoder to regenerate the task model n using the basic state model and the specified task ID as input.

18. The computer system of claim 15, said method further comprising:

for a specified task ID of task model n selected from the group consisting of 1, 2, . . . , and N, executing, by the one or more processors, the decoder to regenerate the task model n using the basic state model and the specified task ID as input.

19. The computer system of claim 15, wherein the encoder has a transformer architecture.

20. The computer system of claim 15, wherein storage space required to store the basic state model in the data storage repository is less, by a factor of about N, than storage space required to store the N task models in the data storage repository.

* * * * *